United States Patent [19]

Waldrop et al.

[11] 4,202,154

[45] May 13, 1980

[54] CROP HEADER FOR A CROP HARVESTING MACHINE HAVING A CROP CONSOLIDATING COMPONENT WHICH DETACHABLY MOUNTS A PLURALITY OF INTERCHANGEABLE CROP GATHERING COMPONENTS

[75] Inventors: T. William Waldrop, New Holland; Joe E. Shriver, East Earl, both of Pa.

[73] Assignee: Sperry Rand Corporation, New Holland, Pa.

[21] Appl. No.: 713,565

[22] Filed: Aug. 11, 1976

[51] Int. Cl.² ............................................. A01D 47/00
[52] U.S. Cl. ........................................ 56/2; 56/15.6; 56/DIG. 9
[58] Field of Search ............. 56/2, 15.6, DIG. 9, 56/14.1–14.6, 364

[56] References Cited

U.S. PATENT DOCUMENTS

| 2,864,224 | 12/1958 | West | 56/2 |
| 3,324,635 | 6/1967 | Ashton et al. | 56/2 |
| 3,383,843 | 5/1968 | Drayer et al. | 56/2 |
| 3,431,711 | 3/1969 | Claas | 56/15.6 |
| 3,474,605 | 10/1969 | Resetich | 56/364 |
| 3,975,889 | 8/1976 | Kerber et al. | 56/2 |

*Primary Examiner*—Jay N. Eskovitz
*Attorney, Agent, or Firm*—Ralph D'Alessandro; Frank A. Seemar; John B. Mitchell

[57] ABSTRACT

A crop harvesting header has a transversely extending crop consolidating component that detachably mounts either one of a plurality of interchangeable crop gathering components, such as a crop windrow-pickup or a row-crop. The lower front portion of the consolidating component is provided with a plurality of spaced apart truncated cone-shaped recessed structures which are respectively adapted to receive a corresponding number of truncated cone-shaped projecting structures mounted on the lower rear portion of the gathering component. The projecting structures are coupled within the recessed structures to detachably mount the crop gathering component forwardly of the crop consolidating component.

7 Claims, 10 Drawing Figures

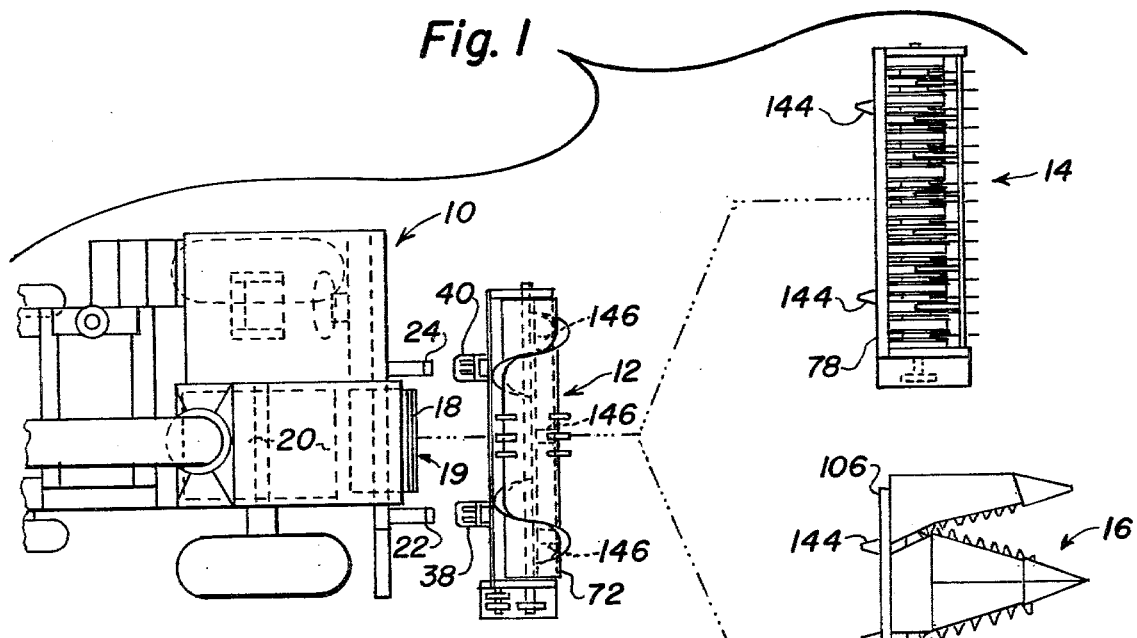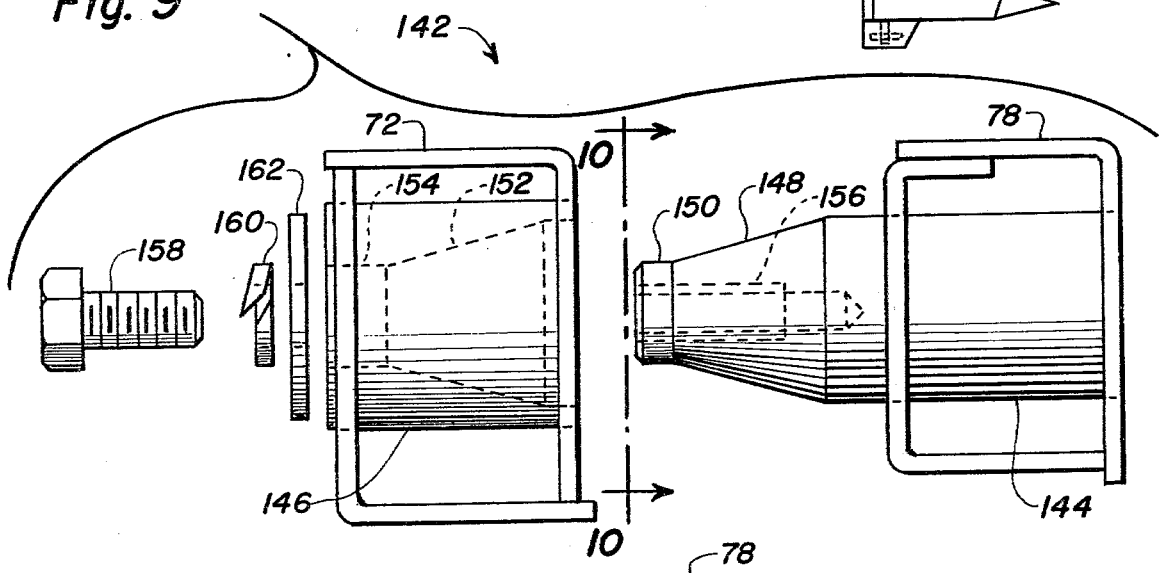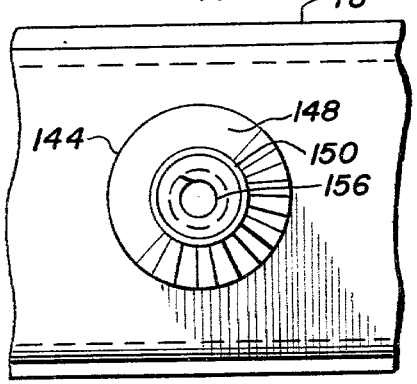

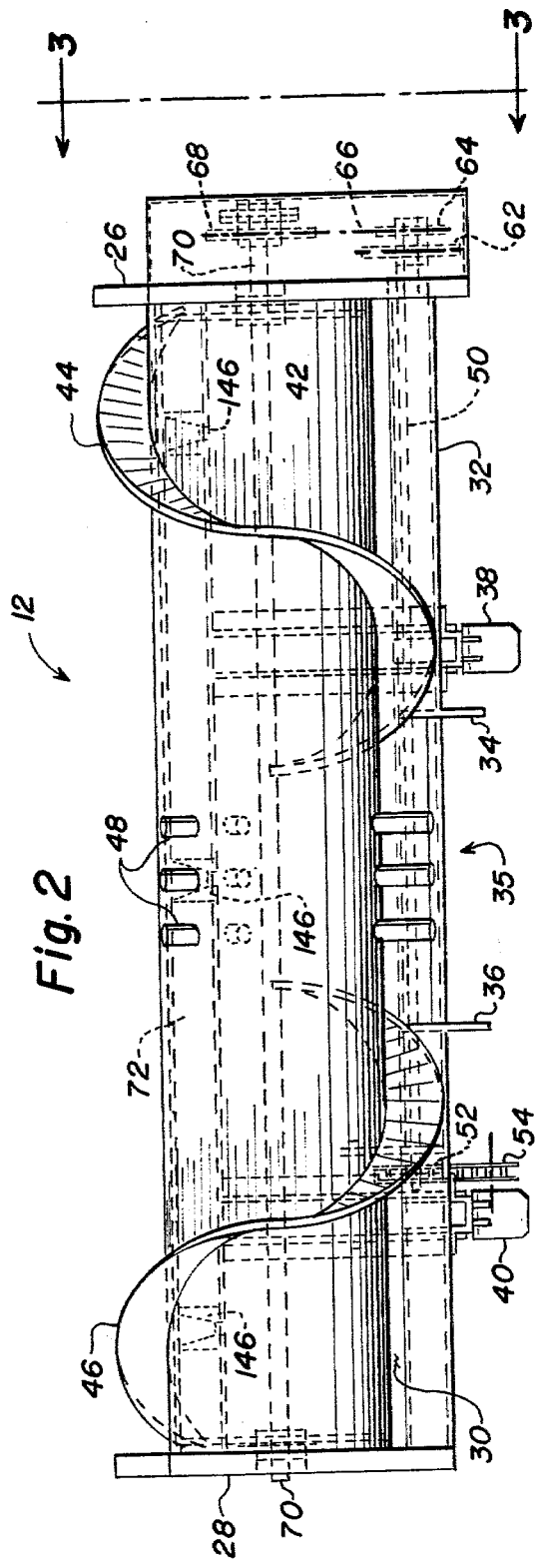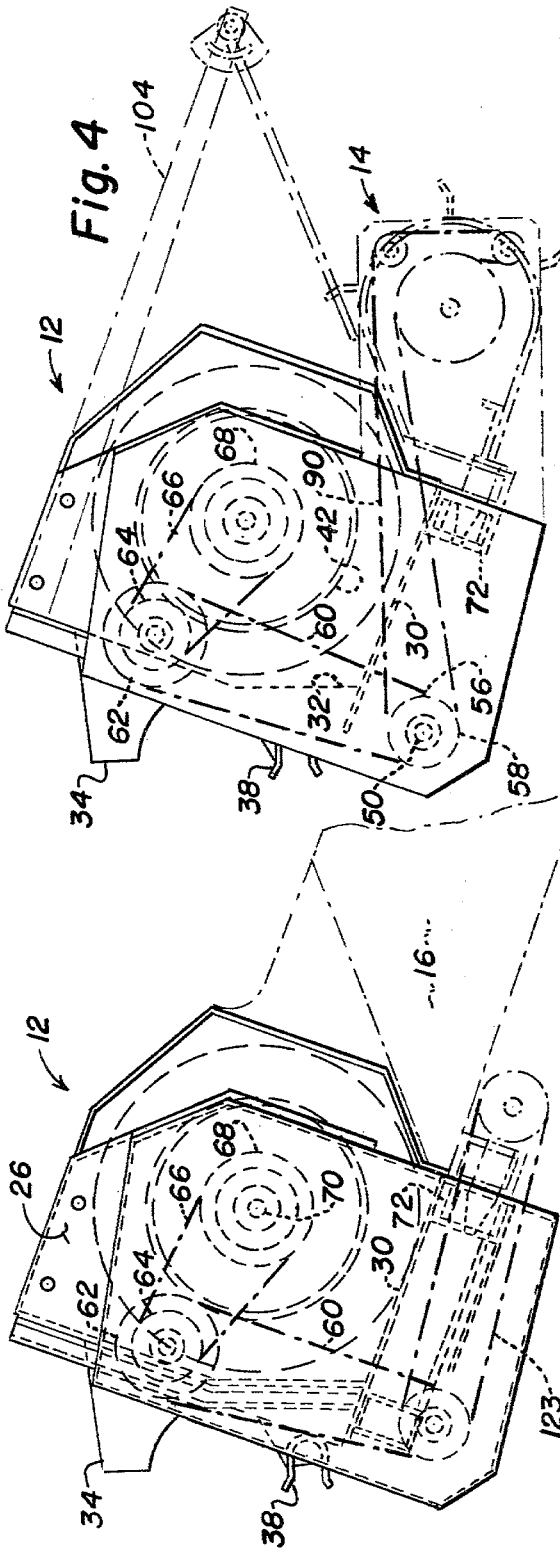

CROP HEADER FOR A CROP HARVESTING MACHINE HAVING A CROP CONSOLIDATING COMPONENT WHICH DETACHABLY MOUNTS A PLURALITY OF INTERCHANGEABLE CROP GATHERING COMPONENTS

CROSS REFERENCE TO RELATED APPLICATIONS

Reference is hereby made to the following co-pending U.S. application dealing with related subject matter and assigned to the assignee of the present invention: "An Improved Multi-Row Crop Header," by Curtis H. Lindblom et al, U.S. Ser. No. 713,468, filed Aug. 11, 1976.

BACKGROUND OF THE INVENTION

1. Field of the Invention

The present invention relates generally to headers for crop harvesting machines and, more particularly, is directed to a header having a crop consolidating component to which may be detachably mounted interchangeable crop gathering components.

2. Description of the Prior Art

Many types of crop harvesting headers are available on the market today, some of the most common being a windrow pickup type, a row-crop type and a reel-sicklebar type. Generally these headers are adapted to be attached to a harvesting machine, such as a forage harvester, a combine harvester or similar such machines for performing a specific harvesting operation.

For instance, the attachment of a windrow-pickup header to a forage harvester enables the harvester to harvest such crops as hay, alfalfa, etc. which have been previously cut and windrowed whereas the attachment of a row crop header enables the harvester to harvest standing crops planted in rows, such as corn and sorghum.

To date, these different types of crop headers have been of a unitary structure or construction generally including a forward crop gathering component that gathers the crop from the field and delivers the same rearwardly to a crop consolidating component that transfers the gathered crop to the harvesting machine. The crop gathering component customarily distinguishes one type of crop header from another whereas the crop consolidating component is the same or is common to many different types of headers.

However, because of the unitary structure or construction of these different headers, each has its own crop consolidating component which results in a disadvantage duplication of parts and thereby higher cost with respect to each header.

SUMMARY OF THE INVENTION

The present invention obviates the aforementioned disadvantages by providing a crop header for a crop harvesting machine having a crop consolidating component which detachably mounts a plurality of interchangeable crop gathering components. In other words, the invention contemplates combining the use of one consolidating component with several different types of gathering components to thereby form a respective number of crop header units, each being adapted to perform a specific harvesting operation.

Accordingly, the crop header of the present invention comprises a crop consolidating component, a crop gathering component and means for detachably mounting the crop gathering and crop consolidating components together.

More particularly, the detachable mounting means includes first mounting means on the crop consolidating component and second mounting means on the crop gathering component, the first and second mounting means being complementary such that the crop gathering component can be mounted on and forwardly of the crop consolidating component. Specifically, a plurality of spaced apart projecting structures are mounted on one of the crop consolidating and crop gathering components and a plurality of spaced apart recessed structures are mounted on the other one of the crop consolidating and crop gathering components. Preferably, each of the projecting structures and recessed structures have a truncated-cone shaped configuration, so as to register with one another.

Further, the detachable mounting means includes means for fastening the projecting structures within the respective recessed structures. Still further, the fastening means includes a threaded portion mounted axially within each of the projecting structures and a respective fastener element threadable on the threaded portion for attaching the respective projecting and recessed structures together, and thus, the detachable mounting of the crop gathering component on the crop consolidating component to thereby form an operable unitary structure adapted to perform a harvesting operation.

An important feature and advantage of the header of the present invention is the detachably mounting of the crop gathering component to the crop consolidating component. This detachable mounting feature allows the interchangeable mounting of a plurality of different types of crop gathering components to a common crop consolidating component to thereby form a plurality of different crop header units and thus reduce the cost of each separate header unit. Further, such detachable mounting feature allows a crop header to be quickly and easily adapted from one type of harvesting operation to another. Still further, each of the detachably mounted components can be more easily moved and transported separately than a header having its components mounted together.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following description reference will be frequently made to the attached drawings in which:

FIG. 1 is a plan view of a forage harvester and the components of a crop header detachably separated in accordance with the principles of the present invention, the crop header including a consolidating auger component adapted to be attached to the front of the harvester and a windrow-pickup component or a row-crop component, each of the latter components capable of being interchanged with one another and detachably mounted forwardly of the auger component.

FIG. 2 is an enlarged plan view of the auger component of the crop header of FIG. 1, with the auger component having been rotated 180° about a vertical axis.

FIG. 3 is a side elevational view of the auger component as taken along lines 3—3 of FIG. 2 with the row-crop component being schematically shown in broken-line form mounted forwardly of the auger component.

FIG. 4 is a side elevational view of the auger component similar to that of FIG. 3, but illustrating the windrow-pickup component in broken line form being substituted or interchanged for the row-crop component of FIG. 3 and mounted forwardly of the auger component.

FIG. 9 is an enlarged exploded plan view of the detachable mounting means, as incorporated by the present invention, showing in detail the respective trucated-cone shaped projecting and recessed structures as associated with the frame members of the respective auger component and gathering components.

FIG. 10 is a frontal view of one of the projecting structures as taken along line 10—10 of FIG. 9.

DETAILED DESCRIPTION OF THE INVENTION

Figure 5:
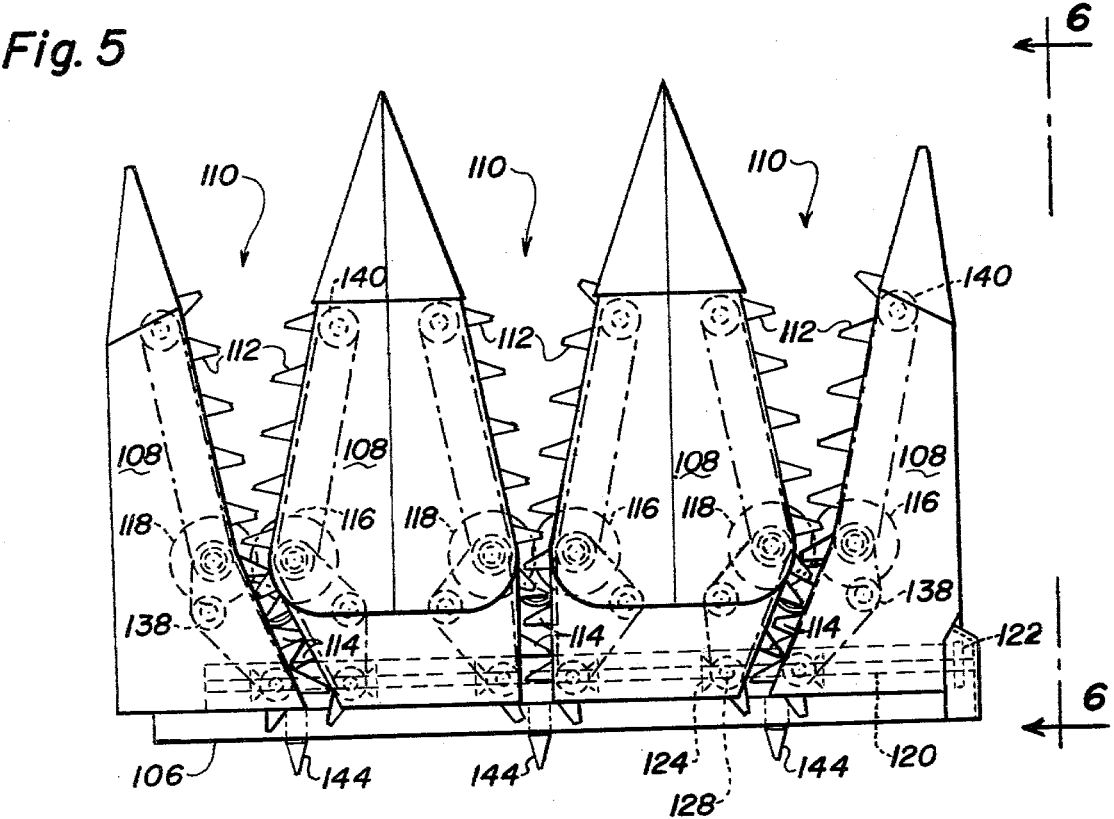
FIG. 5 is an enlarged plan view of the row-crop component of FIG. 1.

In the following references, right hand and left hand references are determined by standing at the rear of the machine facing in a direction of forward travel. Also, in the following description, it is to be understood that such terms as "forward," "rearward," "left," "upwardly," etc. are words of convenience and are not to be construed as limiting terms.

IN GENERAL

Referring now to the drawings, and particularly to FIG. 1, there is shown a mobile harvester unit 10, with a header attachment which incorporates the principles of the present invention. Particularly, the header attachment includes a crop transferring means in the form of a crop consolidating auger component 12. Also, included by the header attachment is a crop gathering means which may be detachably mounted to the component 12. The crop gathering means is illustrated in the form of interchangeable components, such being a windrow-pickup component 14 and a row-crop component 16. The auger component 12 is adapted to be attached to the front of the harvesting unit 10 and further is adapted to interchangeably detachably mount each of the windrow pickup and row-crop components 14,16 respectively, as will be clearly discussed hereinafter. A unitary header structure is, in effect, formed when either the windrow-pickup component 14 or the row-crop component 16 is mounted forwardly on the auger component 12. The respective header structures or units are commonly referred to in the art as a "windrow pickup or pickup header" and a "row-crop header" and are operational in the conventional manner.

The mobile harvesting unit 10, depicted in FIG. 1, diagrammatically represents a forage harvester base unit, being of well known construction having a front portion that houses a feed roll assembly 18 that feeds crop material rearwardly to a cutterhead 20 that reduces the crop material into ensilage. On the unit 10 located adjacent opposite sides of an infeed opening 19 to the feed roll assembly 18, a pair of arms 22,24 are provided for mounting the auger consolidating component 12 forwardly of the harvester unit 10.

Although the mobile harvesting unit 10 forms no part of the present invention and is merely illustrative of a base unit of a self-propelled forage harvester, it should be understood that the unit 10 could be a pull-type model, or for that matter, of the general class of mobile agricultural harvesting machines, such as, in addition to forage harvesters, combine harvesters, swathers or like devices. It should be further pointed out here that the invention is not specifically limited to the consolidating auger 12, the windrow-pickup 14 or the row-crop 16, but is much broader in its applications, including various other types of crop transferring and gathering components.

CROP TRANSFER MEANS

The crop transfer means, such as auger component 12, as best seen in FIG. 2, includes right and left sidewalls 26,28 respectively, a bottom wall 30 and a rear wall 32 having a centrally located discharge opening 35 defined therein. Adjacent the opposite sides of the discharge opening 35 and projecting outwardly and rearwardly from the rear wall 32 is a pair of throat plates 34,36. Additionally provided on the rear wall 32 is a pair of conventional mounting brackets 38,40 which attach to arms 22,24 for mounting of the auger component 12 forwardly of the harvesting unit 10 such that the discharge opening 35 in the rear wall 32 aligns with the infeed opening 19 to the feed rolls 18 in the forward portion of the unit.

Rotatably mounted and transversely extending between the sidewalls 26,28 is an auger cylinder 42 having left and right oppositely wrapped spiral flights 44,46. Each of the flights 44,46 extends from a respective end inwardly toward the central section of the auger cylinder 42 wherein there is positioned an array of circumferentially spaced auger fingers 48. The auger cylinder 42 is rotated in a clockwise direction as viewed in FIGS. 3 and 4 such that material is laterally conveyed by the flights 44,46 to the fingers 48 that direct the material rearwardly through the discharge and infeed openings 35,19 and into the feed roll assembly 18 of the harvester unit 10.

Again referring to FIGS. 2 and 4, drive means for the auger cylinder 42 is provided which includes a drive shaft 50 that transversely extends, from the left mounting bracket 40 across and spaced below the rear portion of bottom wall 30, and through the right sidewall 26. The left end of drive shaft 50 supports a drive sprocket 52 that is connected by chain 54 to a drive sprocket (not shown) on the harvesting unit 10 and the right end of the drive shaft 50 supports an inboard sprocket 56 and outboard sprocket 58. The inboard sprocket 56 is connected by a chain 60 to the inboard sprocket 62 of a double sprocket assembly rotatably supported on the upper portion of right sidewall 26. An outboard sprocket 64 of the upper sprocket assembly is connected by a chain 66 to a sprocket 68 of a slip clutch assembly supported on the right end of an auger shaft 70 that rotatably mounts the auger cylinder 42 between the sidewalls 26,28. The lower outboard sprocket 58 is for driveably connecting the respective interchangeable gathering components 14 and 16.

Extending between the lower front portion of the sidewalls 26,28 is a transverse tubular frame member 72 which supports portions of the detachably mounting means associated with this invention. The detachable mounting of a crop gathering means, such as row crop component 14 and windrow pickup component 16, to and forwardly of the auger component 12 will be discussed in detail further on in this specification.

CROP GATHERING MEANS

In FIG. 1, by way of example there is shown two types of crop gathering means, a windrow pickup component 14 and a row-crop component 16; however, it should be noted that there exists other types of crop gathering means wherein the principles of the invention would be applicable. The detachable mounting of either one of these crop gathering components on the crop consolidating auger 12, in effect, forms a unitary header assembly. Since the individual operative crop gathering elements of each of the crop gathering components are well known to those skilled in the art, for the sake of brevity the following discussion of each gathering component, i.e., the windrow pickup component 14 and row crop component 16, will be limited to a brief description of the main elements thereof and their operational relationships.

Figure 7:
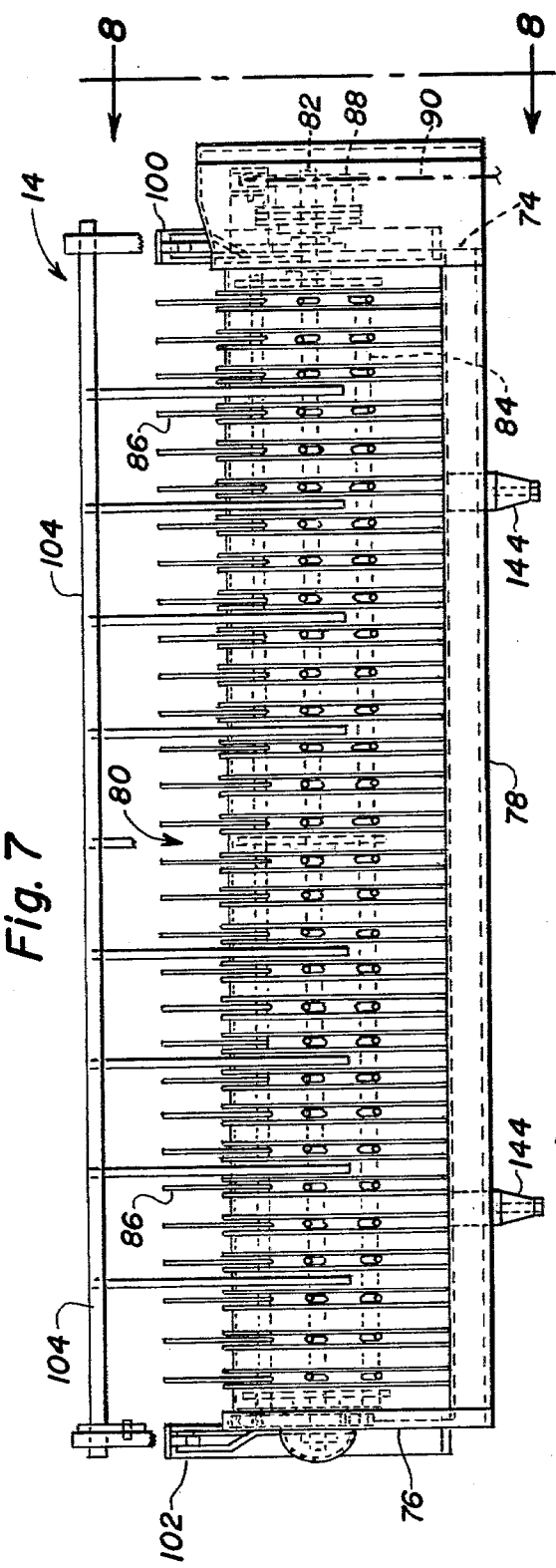
FIG. 7 is an enlarged plan view of the windrow-pickup component of FIG. 1.
Figure 8:
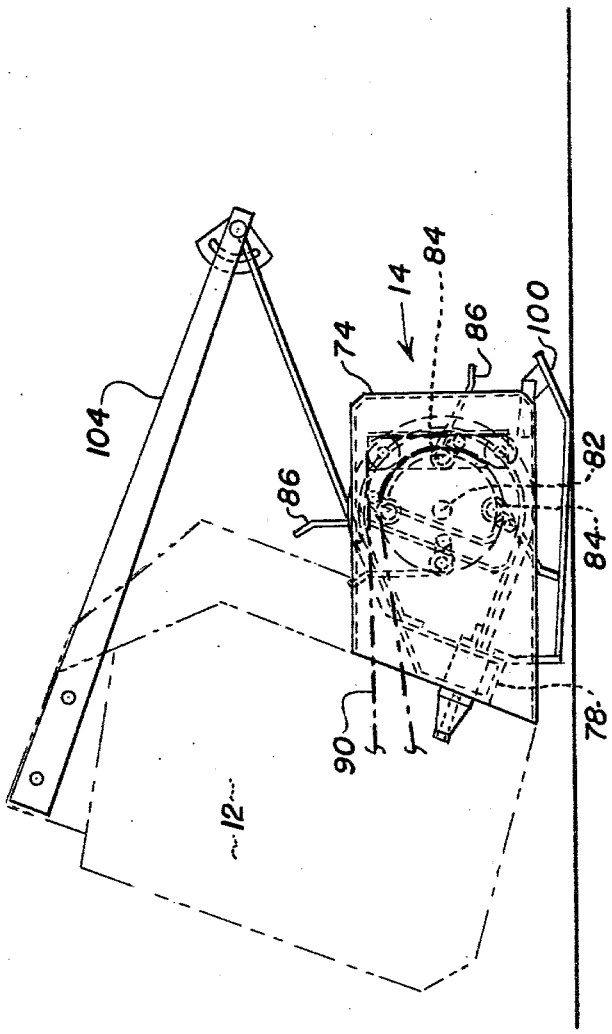
FIG. 8 is a side elevational view of the windrow-pickup component, taken along line 8—8 of FIG. 7, mounted to the auger component which is shown in broken-line form.

Now, in reference to FIGS. 7 and 8, the windrow pickup component 14 includes respective right and left sidewalls 74,76 a lower rear transversely extending tubular frame member 78 and a conventional pickup drum assembly 80 mounted between the sidewalls 74,76. The pickup drum assembly 80 has a central axially extending drive shaft 82 that supports four cam actuated traversely extending rolobars 84, each supporting an array of pickup tines 86 that move through respective slots in the drums. The arrangement is such that the pickup tines 86 retract inwardly when they are withdrawn downwardly through the slots in the pickup drum as the shaft 82 and rolobars 84 are rotated in a counterclockwise direction, as viewed in FIG. 8. The right end of shaft 82, adjacent the outboard side of the right sidewall 74, supports a slip clutch drive having a driven sprocket 88 which is connectable by a chain 90 to the lower outboard sprocket 58 of the auger component 12.

The windrow pickup component 14 further includes a pair of guide shoes 100,102 for guiding the windrow pickup component 14 over the ground. Each guide shoe 100,102 is attached to a lower portion of the respective right and left sidewalls 74,76. Also shown associated with the windrow-pickup component 14 in FIGS. 7 and 8, as well as in FIG. 4, is a conventional windguard attachment 104 that attaches to the top portion of the auger component 12 and extends forwardly over the pickup component 14 with downwardly projecting rods that tend to confine the windrowed crop material on the pickup tines.

Figure 6:
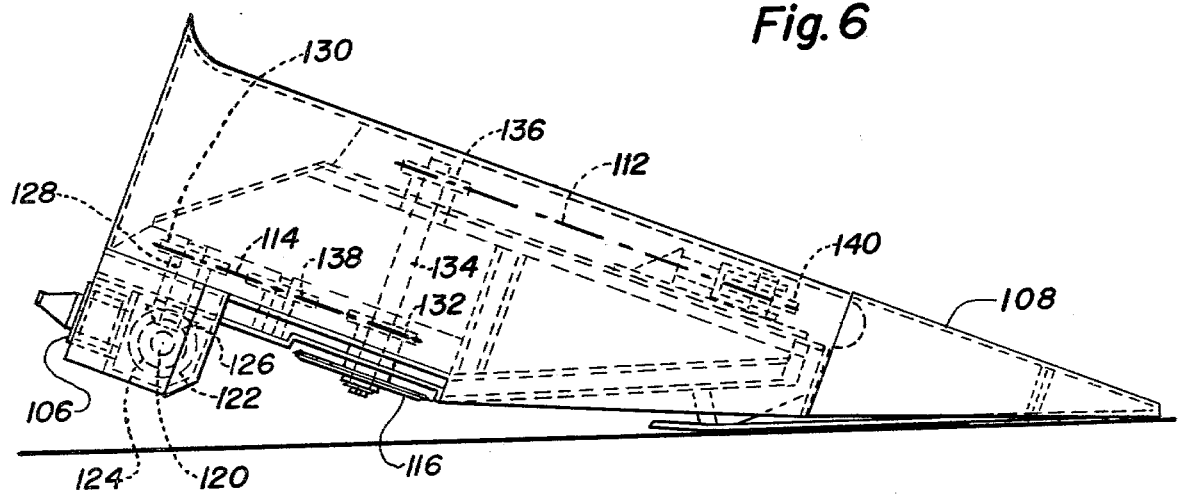
FIG. 6 is a side elevational view of the row-crop component as taken along line 6—6 of FIG. 5.

The row-crop component 16 will now be discussed in reference to FIGS. 5 and 6 wherein there is shown a frame having a transversely extending tubular frame member 106 that mounts a plurality of spaced-apart, fore-and-aft extending crop dividers 108. Crop passageways 110 are defined between adjacent dividers 108. Disposed on opposite sides of each passageway 110 is an upper set of gathering chains 112 and a lower set of butt-gripping chains 114, the upper chains 112 being disposed along the forward portions of the passageways 110, whereas the lower chains 114 are disposed along the rearward portions of the passageways 110. Further, a cutting mechanism in the form of two rotary discs 116,118 is disposed within each passageway 110, forwardly of the lower chains 114. Each of the discs 116,118 are rotatably mounted on the frame of component 16 adjacent opposite sides of each of the respective passageways 110 and extend inwardly into the passageway in an overlapping relationship to sever the crop as it enters the passageway.

The upper chains 112, the lower chains 114 and the rotary cutting discs 116,118 are driven by a suitable drive arrangement that includes a drive shaft 120 that supports on its right end a driven sprocket 122 which is connectable by a chain 123 (FIG. 3) to the lower outboard drive sprocket 58 of the auger component 12. The drive shaft 120 is rotatably mounted to and extends along the forward portion of tubular frame member 106 and supports a number of spaced apart vertical bevel gears 124 that driveably mate with a corresponding number of horizontal bevel gears 126 which are supported on the lower ends of vertical shafts 128. The upper end of each vertical shaft 128 supports a rear lower chain sprocket 130 that is driveably connected to a front lower chain sprocket 132 mounted adjacent the lower end of a cutter shaft 134 that is rotatably mounted on a respective one of the dividers 108 and supports a rear upper chain sprocket 136 on its upper end and the cutter discs 116,118 on its lower end. The lower butt gripping chain 114 is entrained around rear sprocket 130, front sprocket 132 and an intermediate idler sprocket 138 and provides the driving connection for the cutter shaft 134. Each of the upper gathering chains 112 is entrained around rear upper chain sprocket 136 and front upper chain sprocket 140. It should suffice to say that the above-described drive arrangement is operated such that the adjacent portions of the upper and lower chains 112,114 respectively move rearwardly along the passageways 110 and that each disc 116,118 of each of the respective cutting mechanisms are rotated in an opposite direction, inwardly toward the respective passageway.

The tubular frame member 106 is similar to the tubular frame member 78 of the windrow pickup component 14, each of these frame members support generally identical portions of the detachable mounting means which is now to be discussed in detail.

DETACHABLE MOUNTING MEANS

An operational unitary crop header unit is, in effect, formed according to the principles of the present invention which has a common crop transferring component, in this instance being the auger component 12, that selectively mounts one of a plurality of types of crop gathering components (such as the windrow pickup component 14 and the row crop component 16) each adapted to perform a specific harvesting function or operation. The particular means utilized in this invention for the selectively mounting or detachably mounting of one component to another will be discussed first as to the specific elements of the detachable mounting means and their interrelationships and then as to the relationship or association thereof with each of the separate components of the respective header units.

Now, with specific reference to FIGS. 9 and 10, the detachable mounting means, being generally designated by the numeral 142, includes a male member or structure 144 and a female member or structure 146. The male member 144 is a solid shaft having a tapered end portion that includes a truncated cone-shaped section 148 and an integral cylindrical portion 150 extending coaxially therewith. The female member 146 is also a solid cylindrical shaft having an axial cavity or recess adapted to receive the tapered end portion of the male member 144. More specifically, the inner surface of the cavity has a truncated cone-shaped portion 152 so as to register with the truncated cone-shape section 148 of male shaft 144. The cavity also includes an inner cylindrical surface portion 154 which registers with cylindrical portion 150.

The detachable mounting means 142 further includes means for fastening or coupling the male member 144 and the female member 146 together. The tapered end portion of the male member 144 has an axial threaded bore 156 which is adapted to threadedly receive a fastener element such as bolt 158. When the male and female members 144,146 respectively are mated, the bolt is axially extended through a lock washer 160, spaced washer 162, female member 146 and is threadily engaged with the threaded bore 156.

Still, in reference to FIGS. 9 and 10 and also in reference to FIG. 1, it is seen that the male member 144 is housed with a tubular member, that being the tubular frame member 78 of the windrow-pickup component 14 and the tubular frame member 106 of the row-crop component 16. More specifically as set forth in the preferred embodiment, two of such male members 144 are associated with the windrow-pickup component 14 whereas three of such male members 144 are associated with the row-crop component 16. Each of the male members 144 are mounted on the respective tubular frame member 78 and 106 such that the tapered end portion projects outwardly from the rear face or edge of the respective members. In FIGS. 9 and 10, even though the tubular frame member has been designated by the number 78, it is also representative of frame 106 due to the commonality of the respective members.

As seen in FIGS. 1 and 2, as well as FIG. 9, the tubular frame member 72 houses three of the female recessed structures 146. The recessed structures 146 are mounted within tubular frame member 72 such that their cavities open along the front face of the member 72 and are so spaced therealong to receive the male projecting structures 144 of the respective windrow-pickup and row-crop components. It is believed that the mounting of the female recessed structures 146 and the male projecting structure 144 can easily be understood from the drawings, however, it should be pointed out that the specific number of male and female structures are not crucial and further that the specific positions and arrangement thereof is also not crucial. The male projecting structures 144, although being shown on the transverse frame members of the respective gathering components 14,16, could just as well be mounted on the transverse frame member 72 of the auger component 14 and the recessed structures 146 could be so mounted on the respective transverse frame members 78 and 106 of the windrow pickup component 14 and row crop component 16. The reason for only using two of the male projecting structures 144 on the windrow-pickup component 14 whereas three such structures are used on the row crop component 16 is due to the difference in weight and needed support of each component. It thus follows that three recessed structures 146 are needed on the auger component's transverse frame member 72 to interchangeable mount the windrow pickup and row-crop components.

Briefly, the operation of mounting and detaching the pickup-component 14 and the row-crop component 16 to the auger component 12 is as follows:

1. The pickup component 14 is oriented in front of the auger component 12 such that the male projecting structures 144 face the female recessed structures 146.

2. The pickup component 14 and the auger component 12 are then moved together, with the female structures 146 receiving the male structures 144. The preferable truncated cone-shaped configuration of each of the male and female structures ensures proper alignment of the windrow component 14 forwardly on the auger component 12.

3. Once united, or partially united, one bolt 158 is tightened within each threaded bore 156.

4. For operation, the drive chain 90 is connected around the drive sprocket 58 of the auger component and the driven sprocket 88 of the pickup component as shown in FIG. 4.

5. The detaching of the pickup component 14 from the auger component 12 is accomplished by reversing the above steps and thus the drive chain 90 is disconnected, bolts 158 are loosened and removed, and then the respective components are moved apart.

6. The mounting of the row-crop component 16 forwardly on the auger component 12 is accomplished by repeating steps 1–3 above, the difference in operational step 4 is that the drive chain 123 is connected around drive sprocket 58 and the drive sprocket 122; the demounting is the same as step 5.

It can be readily appreciated by those skilled in the art, from a reading of the above description, that the present invention sets forth a novel crop header construction that has the advantage of using one common crop header component to mate with a plurality of other crop header components to form separate header units adapted to perform distinct harvesting operations. Further, it is seen that the attachment and detachment of one component to the other is a very simple and easy operation. A still further important feature realized by the present invention is that each component of a particular crop header can be moved and handled by one man whereas this is not generally true of a header that is not detachable in separate components.

It is thought that the invention and many of its attendant advantages will be understood from the foregoing description and it will be apparent that various changes may be made in form, construction and arrangement of the detachable mounting means without departing from the spirit and scope of the invention or sacrificing any and all of its material advantages, the form hereinbefore described being merely a preferred or exemplary embodiment thereof.

Having thus described the invention, what is claimed is:

1. A harvesting header for a mobile harvesting machine comprising: a transversely elongated main header frame attachable to the harvesting machine and including opposite sides, a floor having a generally horizontal portion with a transverse leading edge extending between the opposite sides and forming a forwardly facing abutment surface, and a rear wall having a crop discharge opening; a transverse crop conveying means mounted on the header frame and extending between the opposite sides above the floor for moving crop material along the floor and discharging it rearwardly through the discharge opening; a plurality of generally fore and aft transversely spaced main frame connecting elements connected to the main header frame and spaced at intervals across the width of the main header frame generally below the floor; a first harvesting attachment including a transversely elongated subframe member and a plurality of generally fore and aft connecting elements respectively cooperative with the main frame connecting elements to releasably connect the attachment to the main frame for vertical and lateral rigidity while permitting generally fore and aft separation of the attachment from the main frame upon rearward shifting of the main frame relative to the attachment, said attachment including means mounted on the transversely elongated subframe member and operative to remove crop material from the field as the harvesting machine advances and deliver the crop material to the conveying means when the attachment is mounted on the main frame and a transversely extending rearwardly facing abutment surface rearwardly of the crop removal means and operative to seat against the forwardly facing abutment surface of the main header frame when the first harvesting attachment is connected to the main frame; and a second harvesting attachment including a second transversely elongated subframe member and a plurality of generally fore and aft connecting elements connected to said second subframe member and respectively cooperative with the main frame connecting elements with the first attachment means is separated from the main frame to releasably connect the second harvesting attachment to the main frame for vertical and lateral rigidity while permitting generally fore and aft separation of the main frame connecting elements from said attachment connecting elements upon rearward shifting of the main frame relative to the second subframe, said second harvesting attachment including a plurality of row units mounted on the transversely elongated subframe member, each row unit being adapted to receive a row of row planted crop material as the machine advances and deliver the crop material to the crop conveying means when the second harvesting attachment is mounted on the main frame, and a transversely extending rearwardly facing abutment surface operative to seat against the forwardly facing abutment surface on the main header frame when the second harvesting attachment is connected to the main frame; and releasable locking means operatively associated with the main frame connecting elements for selectively locking either the first or second harvesting attachment connecting elements to the main frame connecting elements.

2. A harvesting header for a mobile harvesting machine comprising:
a transversely elongated main frame attachable to the harvesting machine, said frame comprising opposite sides, a bottom wall extending between said opposite sides, and a rear wall having a crop discharge opening;
a transverse crop conveying means mounted on said main frame and extending between said opposite sides above the bottom wall for moving crop material along said floor and discharging it rearwardly through the discharge opening;
a first plurality of detachable mounting means spaced along said and across the width of the main frame generally below bottom wall;
a first harvesting attachment comprising a transversely elongated subframe assembly including first transversely extending rearwardly facing means and a second plurality of detachable mounting means spaced along said first rearwardly facing means and respectively cooperative with said first plurality of detachable mounting means to releasably connect the attachment to the main frame, said attachment further comprising means mounted on said transversely elongated subframe assembly and operative to remove crop material from the field as the harvesting machine advances and deliver the crop material to said crop conveying means when the attachment is mounted on the main frame, said first rearwardly facing means operatively disposed adjacent said main frame under conditions where said first harvesting attachment is connected to the main frame;
and a second harvesting attachment comprising a second transversely elongated subframe assembly including second transversely extending rearwardly facing means and a third plurality of detachable mounting means spaced along said second transversely extending rearwardly facing means and respectively cooperative with said first plurality of detachable mounting means to releasably connect the second harvesting attachment to the main frame, said second harvesting attachment further comprising a plurality of row units mounted on said second transversely elongated subframe assembly, each row unit being adapted to receive a row of row planted crop material as the machine advances and delivers the crop material to said crop conveying means when the second harvesting attachment is mounted on the main frame, said second rearwardly facing means operatively disposed adjacent said main frame transverse member under conditions where said second harvesting attachment is connected to the main frame; and
releasable locking means operatively associated with said first plurality of detachable mounting means for selectively locking either said second or third plurality of detachable mounting means thereto under conditions where said first or second harvesting attachment, respectively, is connected to said main frame.

3. The harvesting header as set forth in claim 2 wherein:
said first plurality of detachable mounting means and said second plurality of detachable mounting means comprise a male portion and a female portion which are adapted to register with one another, said male portion being mounted on one of said transverse member and said first transversely extending rearwardly facing means and said female portion being mounted on the other one of said transverse member and said first transversely extending rearwardly facing means;
said male portion comprising truncated cone-shaped projecting structures;
said female portion comprising truncated cone-shaped recessed structures adapted to respectively receive said projecting structures, and
said releasable locking means including means for fastening said projecting structures within said respective recessed structures.

4. The harvesting header as set forth in claim 2 wherein:
said first plurality of detachable mounting means and said third plurality of detachable mounting means comprise a male portion and a female portion which are adapted to register with one another, said male portion being mounted on one of said transverse member and said second transversely extending rearwardly facing means and said female portion being mounted on the other one of said transverse member and said second transversely extending rearwardly facing means;

said male portion comprising truncated cone-shaped projecting structures;

said female portion comprising truncated cone-shaped recessed structures adapted to respectively receive said projecting structures, and said releasable locking means including means for fastening said projecting structures within said respective recessed structures.

5. The harvesting header as described in claim 3, wherein said fastening means include threaded portions mounted axially within said projecting structures and respective fastener elements threadable on said threaded portions for attaching said projecting and recessed structures together.

6. The harvesting header as described in claim 4, wherein said fastening means include threaded portions mounted axially within said projecting structures and respective fastener elements threadable on said threaded portions for attaching said projecting and recessed structures together.

7. A harvesting header for a mobile harvesting machine comprising:

a transversely elongated main frame attachable to the harvesting machine, said frame comprising opposite sides, a floor extending between said opposite sides, a transverse member also extending between said sides and adjacent said floor, and a rear wall having a crop discharge opening;

a transverse crop conveying said mounted on said main frame and extending between said opposite sides above the bottom wall for moving crop material along said floor and discharging it rearwardly through the discharge opening;

a first plurality of detachable mounting means spaced along said transverse member across the width of the main frame generally below the floor;

a first harvesting attachment comprising a transversely elongated subframe assembly including first transversely extending rearwardly facing means and a second plurality of detachable mounting means spaced along said first rearwardly facing means and respectively cooperative with said first plurality of detachable mounting means to releasably connect the attachment to the main frame, said attachment further comprising means mounted on said transversely elongated subframe assembly and operative to remove crop material from the field as the harvesting machine advances and deliver the crop material to said crop conveying means when the attachment is mounted on the main frame, said first rearwardly facing means operatively disposed adjacent said main frame transverse member under conditions where said first harvesting attachment is connected to the main frame; and a second harvesting attachment comprising a second transversely elongated subframe assembly including second transversely extending rearwardly facing means and a third plurality of detachable mounting means spaced along said second transversely extending rearwardly facing means and respectively cooperative with said first plurality of detachable mounting means to releasably connect the second harvesting attachment to the main frame, said second harvesting attachment further comprising a plurality of row units mounted on said second transversely elongated subframe assembly, each row unit being adapted to receive a row of row planted crop material as the machine advances and delivers the crop material to said crop conveying means when the second harvesting attachment is mounted on the main frame, said second rearwardly facing means operatively disposed adjacent said main frame transverse member under conditions where said second harvesting attachment is connected to the main frame; and releasable locking means operatively associated with said first plurality of detachable mounting means for selectively locking either said second or third plurality of detachable mounting means thereto under conditions where said first or second harvesting attachment, respectively, is connected to said main frame.

* * * * *